United States Patent [19]

Lagher

[11] 4,142,418

[45] Mar. 6, 1979

[54] TEMPERATURE SENSITIVE MEMBER

[76] Inventor: Gunnar Lagher, Kumlevägen 5 A, Fjälkinge, Sweden, S-290 34

[21] Appl. No.: 891,025

[22] Filed: Mar. 28, 1978

[30] Foreign Application Priority Data

Apr. 5, 1977 [SE] Sweden ................................ 7703939

[51] Int. Cl.[2] ........................... G01K 5/66; G01K 5/68

[52] U.S. Cl. .................................... 73/363.9; 337/379; 428/913

[58] Field of Search ................. 73/363.5, 363.7, 363.9; 428/545, 592, 616, 913; 337/111, 379; 428/458

[56] References Cited

U.S. PATENT DOCUMENTS

| | | | |
|---|---|---|---|
| 2,469,537 | 5/1949 | Wohrer | 428/913 |
| 2,573,686 | 11/1951 | Blinn | 73/363.5 |
| 2,793,571 | 5/1957 | Way et al. | 428/592 |
| 3,415,712 | 12/1968 | Barker | 73/363.5 |

*Primary Examiner*—S. Clement Swisher
*Attorney, Agent, or Firm*—Toren, McGeady and Stanger

[57] ABSTRACT

A temperature sensitive member, such as used in a thermostat, is formed of an elongated metal strip coated with a layer of polymer material. Holes are formed through the metal strip over its length and the layer of polymer material extends into the holes. The polymer material layer has a greater thickness than the metal strip. In one embodiment, the member can be formed by helically slitting a tubular member with the ends of the slit spaced inwardly from the ends of the tubular member. The polymer material layer is coated on the interior surface of the tubular member.

9 Claims, 4 Drawing Figures

TEMPERATURE SENSITIVE MEMBER

SUMMARY OF THE INVENTION

The present invention is directed to a temperature sensitive member formed of two strips of different materials, one of metal and the other of a polymer so that upon exposure to varied temperatures one end of the member changes position relative to the other end.

Thermostats contain some kind of a temperature sensitive member, which, when exposed to change in temperatures, causes one end of the member to move in relation to the other, usually a fixed end. Such temperature sensitive members may be rods, tubes of a material with a high coefficient of length expansion or so-called bimetallic thermostats. Bimetallic temperature sensitive members consist of rod or strip-shaped pieces of two different metals. The metal strips are fastened together at the ends. The metals selected have different coefficients of length expansion, accordingly, one of the strips expands more than the other when exposed to rising temperatures. Consequently, the bimetallic strip is bent and its free end will move laterally. The resulting movement is transmitted to an electric on-off switch or, by means of linkages, to some mechanical regulation device.

The temperature sensitive member generally used in known thermostats, and particularly of the bimetallic type, have the disadvantage that they provide very small deflections within a limited range of temperatures, for example, for controlling room temperature. To obtain an adequate deflecting effect, or for transmitting motion, it has been common to connect several of these members in series. Such series connection of the temperature sensitive members, however, results in comparatively large thermostat units.

The primary object of the present invention is to provide a temperature sensitive member to be used in temperature regulating devices, such as thermostats and the like, such a member should, within a limited temperature range, afford sufficient deflection to influence a selected regulating member between its end positions, the regulating member may be of a mechanical or electromechanical type. Accordingly, the temperature sensitive member embodying the present invention as compared to known temperature sensitive members, provide increased movement, and as a result, stronger power, per degree of temperature change. Moreover, the temperature sensitive member of the present invention can be produced less expensively than the known members.

In accordance with the present invention, a piece of metal, of sheet gauge, having an appropriate length and width for its intended use, is perforated over its length. This piece of metal, which can be made of stainless steel, if necessary, is coated with a polymer layer with the polymer material penetrating into the perforations or holes formed in the metal. Preferably, the thickness of the polymer material layer is greater than that of the metal and the polymer material is chosen from among the qualities of plastics or hard rubber which resist the temperatures to which the composite member is intended to be exposed and also which has a high coefficient of length expansion.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
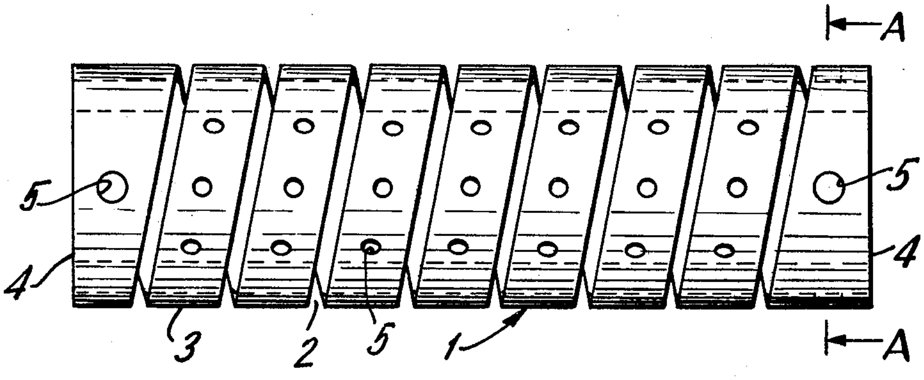
FIG. 1 is a side view of one embodiment of the present invention with the temperature sensitive member having a helical form.
Figure 1A:
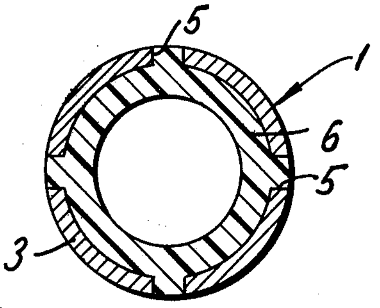
FIG. 1*a* is a cross sectional view of the embodiment shown in FIG. 1 taken along the line A—A.

In FIG. 1, a metal tube 1 has a helical slit 2 extending over most of its length, however, the slit terminates at a position spaced from the ends of the tube. Accordingly, the metal tube 1 consists of a helical strip 3 extending between two ring-shaped end parts 4. Both the strip 3 and the end parts have holes 5 or other perforations. A thermoplastic material is injection molded into the interior of the tube 1, or some other kind of a polymer is cast into the tube, coating the interior with a layer 6 having a thickness which exceeds the thickness of the tube. The polymer material penetrates into the holes 5 and is securely fastened to the helical strip 3 and end parts 4 of the tube 1. After the interior of the tube 1 has been coated with the layer 6 of polymer material, the layer is slit open in the form of a spiral corresponding to the helical strip 3 extending between the end parts 4. The layer, of course, is also present within the end parts 4. Before the polymer material layer is applied, the metal strip 3 can be pre-stretched in the same direction as the polymer layer will turn the spiral at the lowest temperature for which the temperature sensitive member is intended to be used.

Figure 2:
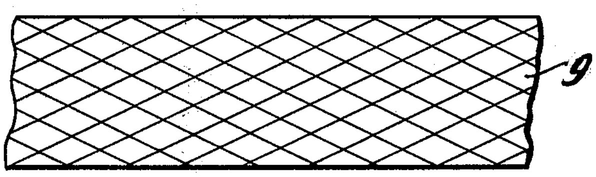
FIG. 2 is a plan view of another embodiment of the present invention with the temperature sensitive member being strip-shaped.
Figure 2A:
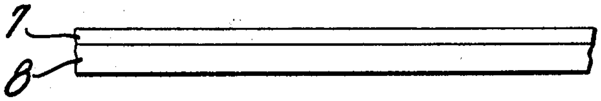
FIG. 2*a* is a side elevation of the embodiment shown in FIG. 2.

In FIG. 2, another embodiment of the invention is illustrated in which the temperature sensitive member is strip-shaped. This embodiment consists of a straight hole-perforated metal strip with a layer of polymer material 9 thicker than the metal strip being injection molded or cast onto it. A very good combination between the metal strip and the plastic material layer is obtained when the metal strip is formed of so-called expanded metal. In FIG. 2 a temperature sensitive member of this type is illustrated with a strip of expanded metal 7 combined with a polymer material layer 8.

The temperature sensitive member illustrated in FIG. 2 can be used as a conventional bimetallic thermostat, however, by pre-stretching the material in a manufacturing process, cup-shaped plates or U-shaped springs can be produced.

In the above embodiments, the polymer material has a significantly different coefficient of length expansion than the material forming the metal strip to provide the desired effect.

Useful polymer materials are found among polyethylenes, polyamides, and acetal resins, such as polyoximethylene and polyvinylacetal. The acetal resins are to preferred, owing to low hygroscopic capacity, if the temperature sensitive member works in water, as is the case in a bathroom mixer unit.

In a typical embodiment of the temperature sensitive member the metal strip is formed of stainless steel having a coefficient of expansion of $12 \times 10^{-6}$, while the polymer material is formed of polyvinylacetal having a coefficient of expansion of $15 \times 10^{-5}$; the numerical values are given per degree centigrade.

In a typical temperature sensitive member embodying the present invention, such as the helically shaped strip shown in FIG. 1, the metal strip has a thickness of 1 mm, while the polymer material has a greater thickness of about 4 mm. In an embodiment as shown in FIG. 2 the metal strip has a thickness of 2 mm, while the polymer material has a thickness of about 5 mm.

In addition to the helically shaped strip shown in FIG. 1 the metal strip and its layer of polymer material could be in the form of a flat spiral.

While specific embodiments of the invention have been shown and described in detail to illustrate the application of the inventive principles, it will be understood that the invention may be embodied otherwise without departing from such principles.

What is claimed is:

1. A temperature sensitive member of a two-material type, wherein the improvement comprises an elongated metal strip having a plurality of holes formed therethrough over the length of said strip, a layer of polymer material coated on said metal strip with the polymer material extending into and secured within the holes in said strip, said polymer material having a significantly different coefficient of expansion than said metal strip.

2. A temperature sensitive member, as set forth in claim 1, wherein said metal strip is wound in the form of a spiral with one surface of said strip facing inwardly into the interior of the spiral and the other surface facing outwardly, said layer of polymer material coated on the inwardly facing surface of the spirally wound strip.

3. A temperature sensitive member, as set forth in claim 1, wherein said layer of polymer material has a greater thickness than said metal strip.

4. A temperature sensitive member, as set forth in claim 1, wherein said metal strip is formed of expanded metal.

5. A temperature sensitive member, as set forth in claim 1, wherein said metal strip is pre-stretched before the application of said layer of polymer material.

6. A temperature sensitive member, as set forth in claim 1, wherein said metal strip comprises a tubular member having a first end and a second end, a continuous helically extending slit formed in said tubular member from a location adjacent to and spaced inwardly from the first end to a location adjacent to and spaced inwardly from the second end with the portions of said tubular member between the opposite ends of said slit and the first and second ends of said tubular member each forming a ring-shaped end part.

7. A temperature sensitive member, as set forth in claim 6, wherein said layer of polymer material is coated on the inner surface of said tubular member and forming a helically wound layer between said ring-shaped end parts.

8. A temperature sensitive member, as set forth in claim 1, wherein said metal strip is formed of stainless steel.

9. A temperature sensitive member, as set forth in claim 3, wherein said metal strip has a thickness in the sheet gauge range.

* * * * *